United States Patent
Hachiya et al.

(10) Patent No.: US 6,747,080 B2
(45) Date of Patent: Jun. 8, 2004

(54) POLYCARBONATE RESIN COMPOSITION FOR THE PRODUCTION OF A SUBSTRATE FOR AN OPTICAL INFORMATION MEDIUM

(75) Inventors: Hiroshi Hachiya, Kurashiki (JP); Nobutsugu Namba, Kurashiki (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 181 days.

(21) Appl. No.: 09/947,448

(22) Filed: Sep. 7, 2001

(65) Prior Publication Data

US 2002/0183428 A1 Dec. 5, 2002

(30) Foreign Application Priority Data

Sep. 7, 2000 (JP) ........................................ 2000-271225

(51) Int. Cl.$^7$ .............................. C08L 69/00; B32B 3/00
(52) U.S. Cl. ........................ 524/306; 428/64.4; 428/412
(58) Field of Search ......................... 524/306; 428/64.4, 428/412

(56) References Cited

U.S. PATENT DOCUMENTS 5,633,060 A  5/1997  Tokuda et al.
6,303,734 B1 * 10/2001 Funakoshi et al. .......... 528/196
6,469,095 B1 * 10/2002 Gareiss et al. .............. 524/504

FOREIGN PATENT DOCUMENTS

JP   61-151236   * 7/1986

* cited by examiner

*Primary Examiner*—Cephia D. Toomer
(74) *Attorney, Agent, or Firm*—Birch, Stewart, Kolasch & Birch, LLP

(57) ABSTRACT

Disclosed is a polycarbonate resin composition for the production of a substrate for an optical information medium, comprising 100 parts by weight of a polycarbonate resin, and 0.0005 to 1.0 part by weight of a mold release agent, wherein the composition exhibits a relative viscosity ($\eta_r$) within the range of from 1.17 to 1.19, the relative viscosity ($\eta_r$) being defined as the ratio ($\eta/\eta_o$) of viscosity value ($\eta$) (25° C.) of a methylene chloride solution of the composition (concentration: 0.005 g/cm$^3$) to viscosity value ($\eta_o$) (25° C.) of methylene chloride, and wherein the relative viscosity ($\eta_r$) of the composition and a melt index (MI) (JIS K 7210, at 280° C., under a load of 2.16 kg) of the composition satisfy the following formulae (I) and (II):

$\eta_r \geq -0.0723 \log MI + 1.316$     (I) and $\eta_r \leq -0.0723 \log MI + 1.324$     (II).

8 Claims, No Drawings

POLYCARBONATE RESIN COMPOSITION FOR THE PRODUCTION OF A SUBSTRATE FOR AN OPTICAL INFORMATION MEDIUM

This nonprovisional application claims priority under 35 U.S.C. §119(a) on patent application No. 2000-271225 filed in JAPAN on Sep. 7, 2000, which is herein incorporated by reference.

BACKGROUND OF THE INVENTION

1. Field of the Invention

The present invention relates to a polycarbonate resin composition for the production of a substrate for an optical information medium. More particularly, the present invention is concerned with a polycarbonate resin composition for the production of a substrate for an optical information medium, which comprises 100 parts by weight of a polycarbonate resin and 0.0005 to 1.0 part by weight of a mold release agent, wherein the polycarbonate resin composition exhibits a specific relative viscosity ($\eta_r$), and wherein the relative viscosity ($\eta_r$) and a melt index (MI) of the polycarbonate resin composition satisfy specific relationships. The polycarbonate resin composition of the present invention is advantageous not only in that the polycarbonate resin composition exhibits an excellent moldability even when molded at low temperatures, but also in that the polycarbonate resin composition can be molded with a short cycle time (that is, the polycarbonate resin composition enables the so-called "high cycle moldings"). Further, the polycarbonate resin composition exhibits excellent thermal stability during the molding thereof, and is capable of suppressing the occurrence of mold deposit (MD) during the molding thereof. Moreover, when the polycarbonate resin composition is molded to obtain a substrate for an optical information medium, such as an optical disc (e.g., a CD or a DVD), the substrate exhibits a satisfactorily high mechanical strength.

2. Prior Art

Polycarbonates have been widely used in various fields as engineering plastics having excellent heat resistance, impact resistance and transparency. Especially, due to the recent expansion of information society, there has been a growing demand for polycarbonates for producing storage media for music and image, and storage media for digital information (such as a storage medium for a personal computer). Nowadays, polycarbonates have become indispensable resins for producing optical discs and optical cards, such as a CD, a CD-ROM, a CD-R, a DVD-ROM and a DVD-R.

In the production of a substrate for an optical information medium, such as an optical disc, formation of precise microgrooves and micropits on the substrate is necessary. Polycarbonates for use in the production of such a substrate need to have high transferability and excellent optical properties, such as low birefringence. Therefore, low molecular weight polycarbonates having a weight average molecular weight of about 15,500 and having a high melt fluidity have hitherto been used in the production of the substrates for the optical information media. In recent years, with respect to the storage media, conventional CD's have been being replaced by DVD's which have recording densities much higher than those of the CD's. For producing substrates used in such optical information media having a high recording density, it is necessary to form very precise microgrooves and micropits on the substrates. Accordingly, as a resin for use in the production of a substrate for the optical information medium, it is demanded to develop a polycarbonate exhibiting a transferability higher than those of the conventional polycarbonates. In addition, due to the fact that the thickness of a substrate for a DVD (DVD substrate) is only about 0.6 mm which is very small as compared to the thickness (about 1.2 mm) of a substrate for a CD (CD substrate), there is also a growing demand for the development of a polycarbonate which has a melt fluidity higher than those of the conventional polycarbonates and, hence, can be used for the production of a substrate having such a small thickness. When a DVD substrate is produced from a conventional polycarbonate, which has a weight average molecular weight of about 15,500 and which has hitherto been used for producing the CD substrates, at a molding temperature employed in the conventional production of the CD substrates (i.e., about 300 to 320° C.), the substrate produced does not have a satisfactorily-low birefringence or a satisfactorily high transferability because the melt fluidity of the polycarbonate is unsatisfactory. Therefore, in order to alleviate this problem, the DVD substrates are produced at a molding temperature as high as 380 to 390° C. so as to lower the melt viscosity of the polycarbonate. Such a molding temperature is too high and, hence, is not generally employed for molding polycarbonates (the molding temperature in the production of molded articles other than optical information media is generally from 270 to 300° C., and the molding temperature in the production of the CD substrates is about 320° C.). The employment of such a high molding temperature causes problems, such as heat deterioration of the polycarbonate, and large warpage of the produced substrate. Further, since the time needed for cooling the substrate becomes long, molding cycle necessarily becomes long, thereby leading to a lowering of the productivity and marked occurrence of mold deposit. The marked occurrence of mold deposit not only causes a lowering of the quality of the substrate, but also necessitates frequent dismantling and cleaning of the mold employed for molding the polycarbonate. Therefore, it has been desired to solve the problems accompanying the above-mentioned high temperature molding.

It is well known that a low molecular weight polycarbonate has an improved melt fluidity. However, it has been impossible to solve the problems accompanying the above-mentioned high temperature molding simply by using a low molecular weight polycarbonate for producing DVD substrates. Therefore, several attempts have been made to solve the problems by methods other than the method which simply uses a low molecular weight polycarbonate. For example, in an attempt to shorten the time needed for cooling a shaped article by using, in a high temperature molding, a polycarbonate composition having improved mold release characteristics, Unexamined Japanese Patent Application Laid-Open Specification No. 10-60105 proposes a polycarbonate composition containing 3.5 to 8% by weight of polycarbonate oligomers which have a polymerization degree of not more than 4. Although this polycarbonate composition has improved mold release characteristics, the molding of the polycarbonate composition needs to be conducted at high temperatures. Therefore, the polycarbonate composition is disadvantageous in that, when the molding of the polycarbonate composition is conducted at high temperatures for a long time, the polycarbonate oligomers are likely to adhere to the mold used, thereby causing the mold deposit.

Unexamined Japanese Patent Application Laid-Open Specification No. 9-320110 (corresponding to EP 794 209 and U.S. Pat. No. 5,783,653) proposes a method for solving a problem accompanying the use of a low molecular weight polycarbonate which is used for achieving a low melt viscosity of a polycarbonate, i.e., a problem that, due to the low molecular weight of the polycarbonate, the mechanical strength of the polycarbonate is lowered to cause a cracking in the resultant molded article. Specifically, this patent document proposes the use of a polycarbonate having a specific terminal group. However, by this method, the processability of the polycarbonate cannot be satisfactorily improved. Further, since this method uses a specific molecular weight modifier, the content of polycarbonate oligomers in the polycarbonate increases, so that mold deposit markedly occurs.

Unexamined Japanese Patent Application Laid-Open Specification No. 8-293128 (corresponding to EP 691 361 and U.S. Pat. No. 5,633,060) proposes a polycarbonate resin obtained by copolymerizing specific dihydroxy compounds, which has excellent optical properties and an excellent moldability which enables the production of an optical information medium capable of high density recording and storage of information. However, the polycarbonate resin exhibits a poor melt fluidity during the molding thereof, so that the polycarbonate resin is not suitable for the high cycle molding.

As can be seen from the above, the problems accompanying the above-mentioned high temperature molding of a polycarbonate resin have not yet been solved and, hence, the development of a further improved polycarbonate resin has been desired.

SUMMARY OF THE INVENTION

In this situation, the present inventors have made extensive and intensive studies with a view toward solving the above-mentioned problems accompanying the prior art. As a result, it has unexpectedly been found that the problems can be solved by a polycarbonate resin composition which comprises 100 parts by weight of a polycarbonate resin and 0.0005 to 1.0 part by weight of a mold release agent, wherein the polycarbonate resin composition exhibits a specific relative viscosity ($\eta_r$), and wherein the relative viscosity ($\eta_r$) and a melt index (MI) of the polycarbonate resin composition satisfy specific relationships. Specifically, the present inventors have found that, even when the polycarbonate resin composition is molded at low temperatures, the polycarbonate resin composition not only exhibits an excellent moldability, but also can be molded with a short cycle time (that is, the polycarbonate resin composition enables the so-called "high cycle molding"), and that, during the molding of the polycarbonate resin composition, the resin composition exhibits excellent thermal stability, and occurrence of mold deposit (MD) can be suppressed. Further, it has also been found that, when the polycarbonate resin composition is molded to obtain a substrate for an optical information medium, such as an optical disc (such as a CD or a DVD), the obtained substrate exhibits a satisfactorily high mechanical strength. Based on these findings, the present invention has been completed.

Accordingly, it is an object of the present invention to provide a polycarbonate resin composition which is advantageous in that, even when molded at low temperatures, the polycarbonate resin composition not only exhibits an excellent moldability, but also enables the high cycle molding, that, during the molding of the polycarbonate resin composition, the resin composition exhibits excellent thermal stability, and occurrence of mold deposit (MD) can be suppressed, and that the polycarbonate resin composition can be advantageously used in the production of a substrate for an optical information medium, such as an optical disc (such as a CD or a DVD), which substrate has a satisfactorily high mechanical strength.

The foregoing and other objects, features and advantages of the present invention will be apparent from the following detailed description and appended claims.

DETAILED DESCRIPTION OF THE INVENTION

According to the present invention, there is provided a polycarbonate resin composition for the production of a substrate for an optical information medium, comprising:

100 parts by weight of a polycarbonate resin (A) comprising a plurality of aromatic polycarbonate main chains, and 0.0005 to 1.0 part by weight of a mold release agent (B), wherein the polycarbonate resin composition exhibits a relative viscosity ($\eta_r$) within the range of from 1.17 to 1.19, the relative viscosity ($\eta_r$) being defined as the ratio ($\eta/\eta_o$) of viscosity value ($\eta$) of a methylene chloride solution of the polycarbonate resin composition to viscosity value ($\eta_o$) of methylene chloride, wherein the concentration of the polycarbonate resin composition in the methylene chloride solution is 0.005 g/cm$^3$ and each of the viscosity values ($\eta$) and ($\eta_o$) is measured at 25° C., and wherein the relative viscosity ($\eta_r$) of the polycarbonate resin composition and a melt index (MI) of the polycarbonate resin composition as measured at 280° C. under a load of 2.16 kg in accordance with JIS K 7210 satisfy the following formulae (I) and (II):

$$\eta_r \geq -0.0723 \log MI + 1.316 \quad \text{(I) and}$$

$$\eta_r \leq -0.0723 \log MI + 1.324 \quad \text{(II).}$$

For easy understanding of the present invention, the essential features and various preferred embodiments of the present invention are enumerated below.

1. A polycarbonate resin composition for the production of a substrate for an optical information medium, comprising:

100 parts by weight of a polycarbonate resin (A) comprising a plurality of aromatic polycarbonate main chains, and 0.0005 to 1.0 part by weight of a mold release agent (B), wherein the polycarbonate resin composition exhibits a relative viscosity ($\eta_r$) within the range of from 1.17 to 1.19, the relative viscosity ($\eta_r$) being defined as the ratio ($\eta/\eta_o$) of viscosity value ($\eta$) of a methylene chloride solution of the polycarbonate resin composition to viscosity value ($\eta_o$) of methylene chloride, wherein the concentration of the polycarbonate resin composition in the methylene chloride solution is 0.005 g/cm$^3$ and each of the viscosity values ($\eta$) and ($\eta_o$) is measured at 25° C., and wherein the relative viscosity ($\eta_r$) of the polycarbonate resin composition and a melt index (MI) of the polycarbonate resin composition as measured at 280° C. under a load of 2.16 kg in accordance with JIS K 7210 satisfy the following formulae (I) and (II):

$$\eta_r \geq -0.0723 \log MI + 1.316 \quad \text{(I) and}$$

$$\eta_r \leq -0.0723 \log MI + 1.324 \quad \text{(II).}$$

2. The polycarbonate resin composition according to item 1 above, wherein the mold release agent (B) comprises a higher aliphatic acid ester.
3. The polycarbonate resin composition according to item 1 above, which further comprises 0.00005 to 0.3 part by weight of a heat stabilizer (C) comprising a compound selected from the group consisting of a phosphorus compound, a phenolic compound and an acidic compound.
4. The polycarbonate resin composition according to item 1 above, wherein the plurality of aromatic polycarbonate main chains of the polycarbonate resin (A) contain low molecular weight polycarbonate chains, each independently having a molecular weight of 1,000 or less, and wherein the total amount of the low molecular weight polycarbonate chains and the mold release agent (B) is 0.5 to 1.5% by weight, based on the weight of the polycarbonate resin composition.
5. The polycarbonate resin composition according to item 3 above, wherein the plurality of aromatic polycarbonate main chains of the polycarbonate resin (A) contain low molecular weight polycarbonate chains, each independently having a molecular weight of 1,000 or less, and wherein the total amount of the low molecular weight polycarbonate chains, the mold release agent (B) and the heat stabilizer (C) is 0.5 to 1.5% by weight, based on the weight of the polycarbonate resin composition.
6. The polycarbonate resin composition according to item 1 above, which exhibits a relative viscosity lowering ratio (%) of not more than 1%, the relative viscosity lowering ratio (%) being defined by the formula: $[(\eta_r^1 - \eta_r^2)/(\eta_r^1)] \times 100$, wherein $\eta_r^1$ represents the relative viscosity $(\eta/\eta_o)$ as exhibited by the polycarbonate resin composition which has been subjected to a continuous molding in a molding machine having a cylinder temperature of 350° C., and $\eta_r^2$ represents the relative viscosity $(\eta/\eta_o)$ as exhibited by the polycarbonate resin composition which has been subjected to a non-continuous molding in a molding machine having a cylinder temperature of 350° C. wherein the residence time of the resin composition in the molding machine is 10 minutes.
7. The polycarbonate resin composition according to item 1 above, wherein the polycarbonate resin is produced by transesterifying a carbonic diester with an aromatic dihydroxy compound in at least one polymerizer selected from the group consisting of a free-fall polymerizer having a perforated plate and a guide-wetting fall polymerizer having a perforated plate and at least one guide provided in association with the perforated plate.
8. A substrate for an optical information medium, which is in the form of a disc having a thickness of 0.6 mm or less, and which is produced by subjecting the polycarbonate resin composition of any one of items 1 to 7 above to an injection molding.

The polycarbonate resin composition of the present invention comprises 100 parts by weight of a polycarbonate resin (A) comprising a plurality of aromatic polycarbonate main chains, and 0.0005 to 1.0 part by weight of a mold release agent (B).

The polycarbonate resin composition of the present invention exhibits a relative viscosity $(\eta_r)$ within the range of from 1.17 to 1.19, wherein the relative viscosity (1r) is defined as the ratio $(\eta/\eta_o)$ of viscosity value (1) of a methylene chloride solution of the polycarbonate resin composition to viscosity value $(\eta_o)$ of methylene chloride, and wherein the concentration of the polycarbonate resin composition in the methylene chloride solution is 0.005 g/cm³ and each of the viscosity values $(\eta)$ and $(\eta_o)$ is measured at 25° C. Further, in the present invention, it is required that the relative viscosity $(\eta_r)$ of the polycarbonate resin composition and a melt index (MI) of the polycarbonate resin composition as measured at 280° C. under a load of 2.16 kg in accordance with JIS K 7210 satisfy the following formulae (I) and (II):

$$\eta_r \geq -0.0723 \log MI + 1.316 \quad \text{(I) and}$$

$$\eta_r \leq -0.0723 \log MI + 1.324 \quad \text{(II).}$$

When the relative viscosity (ηr) is larger than 1.19 and/or formula (II) above is not satisfied, the melt fluidity of the polycarbonate resin composition becomes unsatisfactory, so that the polycarbonate resin composition disadvantageously exhibits a poor moldablity at low temperatures and the molding cycle cannot be shorten. On the other hand, when the relative viscosity $(\eta_r)$ is smaller than 1.17 and/or formula (I) is not satisfied, the polycarbonate resin composition cannot be used for producing a substrate for an optical information medium, which has a satisfactorily high mechanical strength.

With respect to the polycarbonate resin (A) used in the polycarbonate resin composition of the present invention, there is no particular limitation as long as it is possible to obtain a polycarbonate resin composition which exhibits the above-mentioned specific relative viscosity $(\eta_r)$ and satisfies the above-mentioned formulae (I) and (II); however, as the polycarbonate resin (A), it is preferred to use a polycarbonate resin having a branched structure. Specific examples of polycarbonate resins having a branched structure include those which are described in EP 0 885 912 A1. As described below, with respect to such a polycarbonate resin having a branched structure, by appropriately adjusting the amount of the branched structure and the polymerization degree in the production thereof, it is possible to obtain a polycarbonate resin usable for the production of the polycarbonate resin composition of the present invention, which exhibits the abovementioned specific relative viscosity $(\eta_r)$ and satisfies the above-mentioned formulae (I) and (II). With respect to the polymerization method for producing the polycarbonate resin which has a branched structure and which is usable for the production of the polycarbonate resin composition of the present invention, convention al methods in which an aromatic dihydroxy compound is reacted with a carbonate precursor can be employed. Examples of such conventional methods include the interfacial polymerization process (phosgene process), in which an aromatic dihydroxy compound is reacted with phosgene in the presence of an aqueous sodium hydroxide solution and methylene chloride as a solvent, and the transesterification process (melt process or solid phase polymerization process), in which an aromatic dihydroxy compound is reacted with a carbonic diester (e.g., diphenyl carbonate). In each of these two processes, in order to obtain a polycarbonate which can be used in the present invention, the reaction is conducted under conditions wherein a branched structure is formed in a predetermined amount. In the phosgene process, for producing a polycarbonate resin which has a branched structure and which is usable in the present invention, it is necessary to use a compound having three or more functional groups as a branching agent for forming a branched structure. On the other hand, in the transesterification process, such a polycarbonate resin (which has a branched structure and which is usable in the present invention) can be produced either by a method using a branching agent or a method in which a branching agent is not used and the reaction conditions for producing a polycarbonate resin are appropriately chosen such that a branched structure is formed in a desired amount.

In the present invention, the term "aromatic dihydroxy compound" means a compound represented by the formula:

HO—Ar—OH wherein Ar represents a divalent $C_5$–$C_{200}$ aromatic group. Specific examples of aromatic groups Ar include a phenylene group, a naphthylene group, a biphenylene group, a pyridylene group and a divalent aromatic group represented by the formula: —$Ar^1$—Y—$Ar^2$—, wherein each of $Ar^1$ and $Ar^2$ independently represents a divalent $C_5$–$C_{70}$ carbocyclic or heterocyclic aromatic group, and Y represents a divalent $C_1$–$C_{30}$ alkane group.

In divalent aromatic groups $Ar^1$ and $Ar^2$, at least one hydrogen atom thereof may be replaced by a substituent which does not adversely affect the transesterification reaction for producing a polycarbonate resin, such as an alkyl group having from 1 to 10 carbon atoms, an alkoxy group having from 1 to 10 carbon atoms, a phenyl group, a phenoxy group, a vinyl group, a cyano group, an ester group, an amide group or a nitro group.

Preferred examples of heterocyclic aromatic groups include an aromatic group having in a skeleton thereof at least one hetero atom, such as a nitrogen atom, an oxygen atom or a sulfur atom.

Examples of divalent aromatic groups $Ar^1$ and $Ar^2$ include an unsubstituted or substituted phenylene group, an unsubstituted or substituted biphenylene group and an unsubstituted or substituted pyridylene group. Substituents for $Ar^1$ and $Ar^2$ are as described above.

Examples of divalent alkane groups Y include organic groups respectively represented by the following formulae:

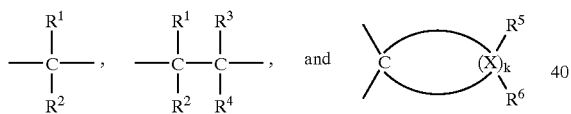

wherein each of $R^1$, $R^2$, $R^3$ and $R^4$ independently represents a hydrogen atom, an alkyl group having from 1 to 10 carbon atoms, an alkoxy group having from 1 to 10 carbon atoms, a cycloalkyl group having from 5 to 10 ring-forming carbon atoms, a carbocyclic aromatic group having from 5 to 10 ring-forming carbon atoms or a carbocyclic aralkyl group having from 6 to 10 ring-forming carbon atoms; k represents an integer of from 3 to 11; each X represents a carbon atom and has $R^5$ and $R^6$ bonded thereto; each $R^5$ independently represents a hydrogen atom or an alkyl group having from 1 to 6 carbon atoms, and each $R^6$ independently represents a hydrogen atom or an alkyl group having from 1 to 6 carbon atoms; and wherein at least one hydrogen atom of each of $R^1$, $R^2$, $R^3$, $R^4$, $R^5$ and $R^6$ may be independently replaced by a substituent which does not adversely affect the transesterification reaction for producing a polycarbonate resin, such as an alkyl group having from 1 to 10 carbon atoms, an alkoxy group having from 1 to 10 carbon atoms, a phenyl group, a phenoxy group, a vinyl group, a cyano group, an ester group, an amide group or a nitro group.

Specific examples of divalent aromatic groups Ar which are represented by the above-mentioned formula: —$Ar^1$—Y—$Ar^2$—include groups respectively represented by the following formulae:

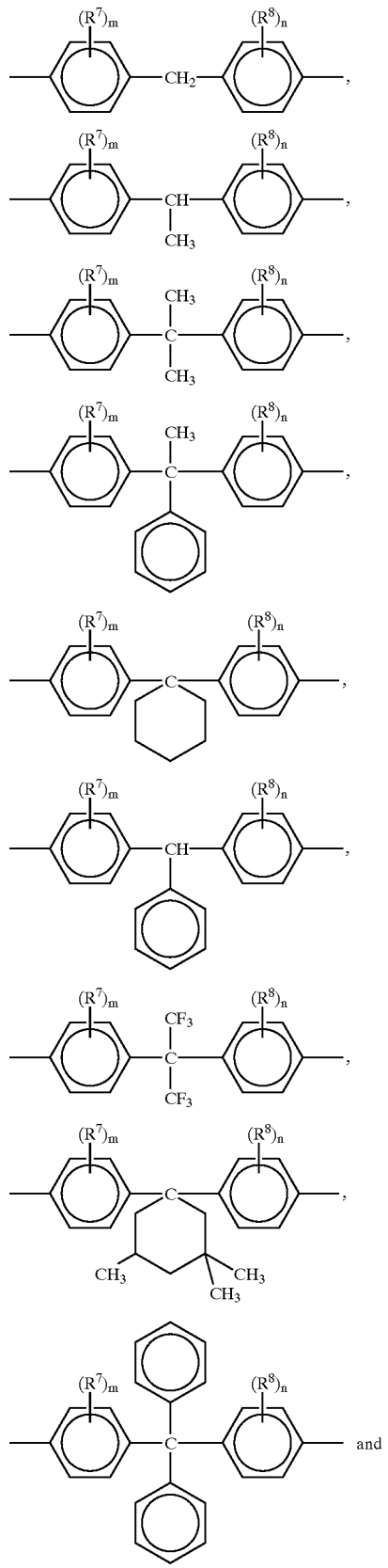

-continued

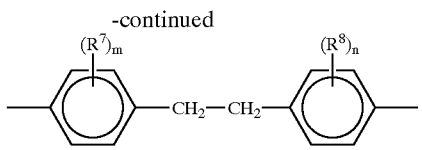

wherein each of $R^7$ and $R^8$ independently represents a hydrogen atom, an alkyl group having from 1 to 10 carbon atoms, an alkoxy group having from 1 to 10 carbon atoms, a cycloalkyl group having from 5 to 10 ring-forming carbon atoms, or a phenyl group; each of m and n independently represents an integer of from 1 to 4, with the proviso that when m is an integer of from 2 to 4, the $R^7$'s are the same or different, and when n is an integer of from 2 to 4, the $R^8$'s are the same or different.

Further examples of divalent aromatic groups Ar include those which are represented by the following formula:

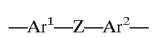

wherein $Ar^1$ and $Ar^2$ are as defined above; and
Z represents a single bond or a divalent group, such as —O—, —CO—, —S—, —SO$_2$—, —SO—, —COO—, and —CON($R^1$)—, wherein $R^1$ is as defined above.

Specific examples of divalent aromatic groups Ar which are represented by the above-mentioned formula: —$Ar^1$—Y—$Ar^2$— include groups respectively represented by the following formulae:

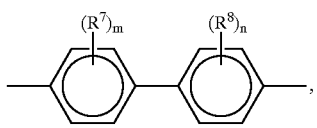

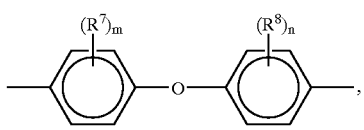

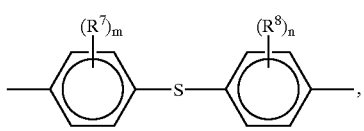

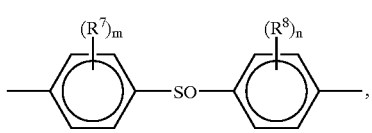

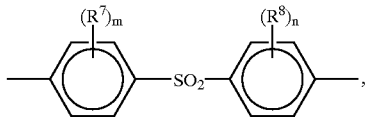

-continued

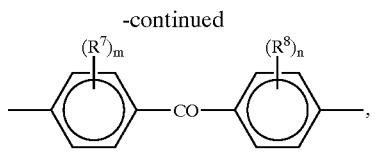

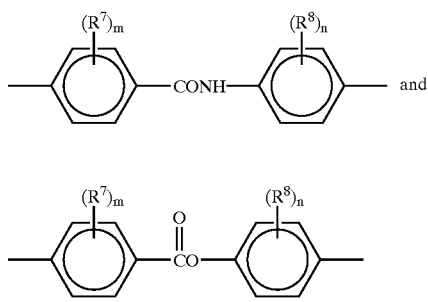

wherein $R^7$, $R^8$, m and n are as defined above.

Further specific examples of divalent aromatic groups Ar include one represented by the following formula:

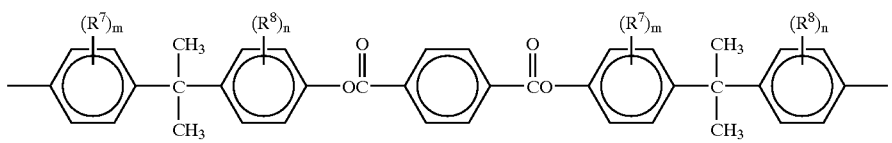

wherein $R^7$, $R^8$, m and n are as defined above.

In the present invention, aromatic dihydroxy compounds may be used individually or in combination. As a representative example of aromatic dihydroxy compounds, there can be mentioned bisphenol A. When bisphenol A is used in combination with other aromatic dihydroxy compounds, it is preferred that the amount of bisphenol A is 85 mole % or more, based on the total molar amount of aromatic dihydroxy compounds used. It is preferred to use an aromatic dihydroxy compound which has low contents of a chlorine atom, an alkali metal and an alkaline earth metal. It is more preferred to use an aromatic dihydroxy compound substantially free of a chlorine atom, an alkali metal and an alkaline earth metal. Specifically, each of the contents of a chlorine atom, an alkali metal and an alkaline earth metal in the aromatic dihydroxy compound is preferably 1 ppm by weight or less, more preferably 0.1 ppm by weight or less. The content of a chlorine atom can be measured by ion chromatography, and the contents of an alkali metal and an alkaline earth metal can be measured by atomic absorption spectrometry.

With respect to the carbonate precursor used in the present invention, an explanation is made below. When the phosgene process is employed, phosgene is used as the carbonate precursor; and when the transesterification process is employed, a carbonic diester is used as the carbonate precursor. The carbonic diester used in the present invention is represented by the following formula:

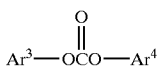

wherein each of $Ar^3$ and $Ar^4$ represents a monovalent $C_5-C_{200}$ aromatic group, and $Ar^3$ and $Ar^4$ may be the same or different.

In each of $Ar^3$ and $Ar^4$, which independently represents a monovalent carbocyclic or heterocyclic aromatic group, at least one hydrogen atom may be replaced by a substituent which does not adversely affect the transesterification reaction for producing the polycarbonate resin, such as an alkyl group having from 1 to 10 carbon atoms, an alkoxy group having from 1 to 10 carbon atoms, a phenyl group, a phenoxy group, a vinyl group, a cyano group, an ester group, an amide group or a nitro group.

Representative examples of monovalent aromatic groups $Ar^3$ and $Ar^4$ include a phenyl group, a naphthyl group, a biphenyl group and a pyridyl group. These groups may or may not be substituted with the abovementioned substituent or substituents.

Preferred examples of monovalent aromatic groups $Ar^3$ and $Ar^4$ include those which are respectively represented by the following formulae:

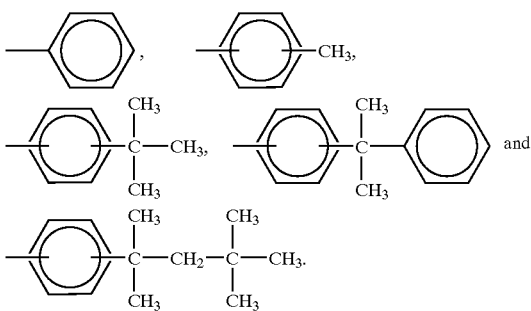

Representative examples of carbonic diesters include di(unsubstituted or substituted)phenyl carbonate compounds represented by the following formula:

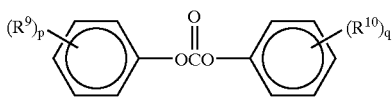

wherein each of $R^9$ and $R^{10}$ independently represents a hydrogen atom, an alkyl group having from 1 to 10 carbon atoms, an alkoxy group having from 1 to 10 carbon atoms, a cycloalkyl group having from 5 to 10 ring-forming carbon atoms or a phenyl group; each of p and q independently represents an integer of from 1 to 5, with the proviso that when p is an integer of 2 or more, the $R^9$'s are the same or different, and when q is an integer of 2 or more, the $R^{10}$'s are the same or different.

Of these diphenyl carbonate compounds, preferred are those having a symmetrical configuration, for example, di(unsubstituted)phenyl carbonate and di(lower alkyl-substituted)phenyl carbonates, e.g., ditolyl carbonate and di-t-butylphenyl carbonate. Especially preferred is diphenyl carbonate, which has the simplest structure.

These carbonic diesters may be used individually or in combination. It is preferred that these carbonic diesters have low contents of a chlorine atom, an alkali metal and an alkaline earth metal. It is more preferred that these carbonic diesters are substantially free of a chlorine atom, an alkali metal and an alkaline earth metal. Specifically, each of the contents of a chlorine atom, an alkali metal and an alkaline earth metal is preferably 1 ppm by weight or less, more preferably 0.1 ppm by weight or less. The content of a chlorine atom can be measured by ion chromatography, and the contents of an alkali metal and an alkaline earth metal can be measured by atomic absorption spectrometry.

In the production of the polycarbonate resin (A), the ratio (i.e., a charging ratio) of the aromatic di-hydroxy compound to the carbonic diester varies depending on the types of the aromatic dihydroxy compound and carbonic diester employed, the desired molecular weight of the polycarbonate resin, the desired proportions of the terminal groups in the polycarbonate resin, and other polymerization conditions. The carbonic diester is generally used in an amount of from 0.9 to 2.5 moles, preferably from 0.95 to 2.0 moles, more preferably from 0.98 to 1.5 moles, per mole of the aromatic dihydroxy compound.

In the production of the polycarbonate resin (A), an aromatic monohydroxy compound may be used for changing the terminal groups, or adjusting the molecular weight of the polycarbonate resin (A).

As the above-mentioned branching agent, compounds having three or more functional groups can be used. Examples of compounds having three or more functional groups include those having three or more functional groups selected from the group consisting of a phenolic hydroxy group and a carboxyl group. Specific examples of such compounds include trimellitic acid, 1,3,5-benzenetricarboxylic acid, pyromellitic acid, 1,1,1-tris(4-hydroxyphenyl)ethane, phloroglucin, 2,4,4'-trihydroxybenzophenone, 2,2',4,4'-tetrahydroxybenzophenone, 2,4,4'-trihydroxydiphenyl ether, 2,2',4,4'-tetrahydroxydiphenyl ether, 2,4,4'-trihydroxydiphenyl-2-propane, 2,4,4'-trihydroxydiphenylmethane, 2,2',4,4'-tetrahydroxydiphenylmethane, 1-(α-methyl-α-(4'-hydroxyphenyl)ethyl)-4-(α',α"-bis(4"-hydroxyphenyl)ethyl)benzene, α,α',α"-tris(4-hydroxyphenyl)-1,3,5-triisopropylbenzene, 2,6-bis(2'-hydroxy-5'-methylbenzyl)-4-methylphenol, 4,6-dimethyl-2,4,6-tris(4'-hydroxyphenyl)-heptene, 4,6-dimethyl-2,4,6-tris (4'-hydroxyphenyl)-heptane, 1,3,5-tris(4'-hydroxyphenyl) benzene, 2,2-bis(4,4-bis(4'-hydroxyphenyl)cyclohexyl) propane, 2,6-bis(2'-hydroxy-5'-isopropylbenzyl)-4-isopropylphenol, bis(2-hydroxy-3-(2'-hydroxy-5'-methylbenzyl)-5-methylphenyl)methane, bis (2-hydroxy-5'-isopropylbenzyl-5-methylphenyl)methane, tetrakis(4-hydroxyphenyl)methane, tris(4-hydroxyphenyl) phenylmethane, 2',4',7-trihydroxyflavone, 2,4,4-trimethyl-2',4',7-trihydroxyflavone, 1,3-bis(2',4'-dihydroxyphenylisopropyl)benzene, a tris(4'-hydroxyaryl)-amyl-S-triazine, 1-(α-methyl-α-(4'-hydroxyphenyl)ethyl)-3-(α',α'-bis(4"-hydroxy-phenyl)ethyl)benzene.

In the present invention, when the polycarbonate resin (A) is produced by the phosgene process, the above-mentioned aromatic dihydroxy compound is reacted with phosgene in a solvent in the presence of an acid binder, a branching agent and a polymerization terminator. As mentioned above, when the phosgene process is employed, the use of a branching agent is indispensable. It is preferred that the amount of the branching agent is from 0.1 to 0.6 mole %, based on the molar amount of the aromatic dihydroxy compound. When no branching agent is used or the amount of the branching agent is smaller than the above-mentioned range, it is likely that the polycarbonate resin produced does not satisfy formula (II) above. On the other hand, when the amount of the branching agent exceeds the above-mentioned range, it is likely that the polycarbonate resin produced does not satisfy formula (I) above. Examples of acid binders include hydroxides of an alkali metal, such as sodium hydroxide and potassium hydroxide, and amine compounds, such as pyridine. Examples of polymerization terminators include monofunctional phenols which are represented by p-tert-butylphenol, p-cumylphenol and phenol. Examples of solvents include hydrocarbon halides, such as methylene chloride and chlorobenzene. Further, for promoting the reaction, a catalyst, such as a tertiary amine or a quaternary am-monium salt, can be used. It is preferred that the reaction temperature is in the range of from 0 to 40° C. and that the reaction time is in the range of from several minutes to 6 hours.

In the present invention, when the transesterification process is employed for the production of the polycarbonate resin (A), a condensation polymerization of the aromatic dihydroxy compound and the carbonic diester is performed by transesterification in the molten state or solid state while heating in the presence or absence of a catalyst under reduced pressure and/or under an inert gas flow. The mode of the transesterification process, the polymerization equipment and the like are not specifically limited. For example, when a molten-state transesterification is employed, examples of reactors employable for performing the transesterification reaction include an agitation type reactor vessel, a wiped film type reactor, a centrifugal wiped film evaporation type reactor, a surface renewal type twin-screw kneading reactor, a twin-screw horizontal agitation type reactor, a wall-wetting fall reactor, a free-fall polymerizer having a perforated plate, and a wire-wetting fall polymerizer having a perforated plate and at least one wire provided in association with the perforated plate. The transesterification reaction can be easily performed using these various types of reactors individually or in combination. In the present invention, it is preferred that the transesterification reaction is performed by using at least one polymerizer selected from the group consisting of the above-mentioned free-fall polymerizer and the above-mentioned wire-wetting fall polymerizer. With respect to the free-fall polymerizer having a perforated plate, reference can be made, for example, to U.S. Pat. No. 5,596,067. With respect to the wire-wetting fall polymerizer, reference can be made, for example, to U.S. Pat. Nos. 5,589,564 and 5,840,826.

The reaction temperature employed for the transesterification reaction is generally from 50 to 350° C., preferably from 100 to 300° C. The reaction pressure employed for the transesterification reaction varies depending on the polymerization degree of the polycarbonate resin being formed, and the like. When the relative viscosity ($\eta_r$) of the polycarbonate resin being formed is 1.12 or lower, the reaction pressure is generally from 400 Pa to atmospheric pressure. When the relative viscosity ($\eta_r$) of the polycarbonate resin being formed is higher than 1.12, the reaction pressure is generally from 10 to 400 Pa. When the transesterification reaction is performed by using the abovementioned free-fall polymerizer having a perforated plate and/or the above-mentioned wire-wetting fall polymerizer having a perforated plate and at least one wire provided in association with the perforated plate, it is preferred that the transesterification reaction is performed at a temperature of not higher than 270° C. When the above-mentioned branching agent is used in the transesterification process, it is generally preferred that the amount of the branching agent is from 0.1 to 0.6 mole %, based on the molar amount of the aromatic dihydroxy compound. With respect to the specific reaction conditions for producing the polycarbonate resin (A) by the transesterification process, reference can be made to the above-mentioned EP 0 885 912 A1.

Further, the production of the polycarbonate resin (A) can also be performed by the solid-state polymerization process, in which a molten-state transesterification process or the phosgene process is first conducted to obtain a prepolymer, and the obtained prepolymer is then subjected to a solid-state polymerization under reduced pressure and/or under an inert gas flow, thereby increasing the polymerization degree of the prepolymer. With respect to the solid-state polymerization process, reference can be made, for example, to U.S. Pat. No. 4,948,871.

In any of the phosgene process, the transesterification process and the solid-state polymerization process, by appropriately choosing the reaction conditions (such as the reaction temperature) within the abovementioned ranges, it is possible to obtain the polycarbonate resin (A), which can be used for the production of the polycarbonate resin composition of the present invention exhibiting the specific relative viscosity ($\eta_r$) and satisfying formulae (I) and (II) above. The relative viscosity ($\eta_r$) and melt index (MI) of the polycarbonate resin composition are influenced to some extent by the mold release agent (B) and the below-mentioned heat stabilizer (C) which is used if desired. Therefore, in the production of the polycarbonate (A) used in the present invention, taking into consideration the influence of the mold release agent (B) and the below-mentioned heat stabilizer (C), the relative viscosity ($\eta_r$) and melt index (MI) of the polycarbonate resin (A) are appropriately adjusted so that the resultant polycarbonate resin composition containing the polycarbonate resin (A) exhibits the specific relative viscosity ($\eta_r$) and satisfies formulae (I) and (II) above.

In the present invention, it is especially preferred to use a polycarbonate resin produced by the transesterification process.

In the present invention, as the mold release agent (B), an ester of a higher fatty acid with an alcohol is used. It is preferred that the higher fatty acid has from 5 to 30 carbon atoms and that the alcohol has from 1 to 30 carbon atoms. Preferred specific examples of esters of a higher fatty acid with an alcohol include glycerol monostearate and pentaerythritol stearate. The amount of the mold release agent (B) is from 0.0005 to 1.0 part by weight, preferably from 0.001 to 0.3 part by weight, more preferably from 0.002 to 0.1 part by weight, most preferably from 0.003 to 0.06 part by weight, relative to 100 parts by weight of the polycarbonate resin (A).

The polycarbonate resin composition of the present invention, which comprises the polycarbonate resin (A) and the mold release agent (B), may further comprise a heat stabilizer (C).

With respect to the heat stabilizer (C), any of conventional stabilizers which can be used for conventional polycarbonate resins can be used. Examples of heat stabilizers (C) include phosphorus compounds, phenolic compounds, sulfur compounds, epoxy compounds, hindered amines and acidic compounds.

Examples of phosphorus compounds which can be used as the heat stabilizer (C) include phosphoric acids, phosphorous esters, phosphinic esters, phosphoric esters and phosphonic esters. Examples of phosphoric acids include phosphoric acid, phosphorous acid, hypophoosphorous acid, pyrophosphoric acid, a polyphosphoric acid and phosphinic acids. Examples of phosphorous esters include phosphorous triesters, phosphorous diesters and phosphorous monoesters. Preferred examples of phosphorous triesters include tris(2,4-di-t-butylphenyl)phosphite, tris(nonylphenyl)phosphite, tris(dinonylphenyl)phosphite, triphenyl phosphite, tetraphenyldipropylene glycol phosphite, tetra(tridecyl)-4,4'-isopropylidenediphenyl diphosphite, bis(tridecyl) pentaerythritol diphosphite, bis(nonylphenyl)pentaerythritol diphosphite, bis(2,4-di-t-butylphenyl)pentaerythritol diphosphite, bis(2,6-di-t-butyl-4-methylphenyl) pentaerythritol diphosphite, distearyl pentaerythritol diphosphite, hydrogenated bisphenol A/pentaerythritol phosphite polymer, and tet-raphenyltetra(tridecyl) pentaerythritol tetraphosphite.

Preferred examples of phosphorous diesters include diphenylhydrogen phosphite, bis(nonylphenyl)hydrogen phosphite, bis(2,4-di-t-butylphenyl)hydrogen phosphite, dicresylhydrogen phosphite, bis(p-t-butylphenyl)hydrogen phosphite, and bis(p-hexylphenyl)hydrogen phosphite.

Preferred examples of phosphorous monoesters include phenyldihydrogen phosphite, nonylphenyldihydrogen phosphite and 2,4-di-t-butylphenyldihydrogen phosphate.

Examples of phenolic compounds which can be used as the heat stabilizer (C) include 2,6-di-t-butyl-p-cresol, 2,6-di-t-butyl-p-anisole, 2,6-di-t-butyl-4-ethylphenol, 2,2'-methylenebis(6-t-butyl-p-cresol), 2,2'-methylenebis(4-ethyl-6-t-butyl-p-phenol), 4,4'-methylenebis(6-t-butyl-p-cresol), 4,4'-butylidenebis(6-t-butyl-m-cresol), tetrakis(methylene-3-(3',5'-di-t-butyl-4'-hydroxyphenyl) propionate)methane, 4,4'-thiobis(6-t-butyl-m-cresol), stearyl-β-(3,5-di-t-butyl-4-hydroxyphenyl) propionate, 1,3,5-trimethyl-2,4,6-tris(3,5-di-t-butyl-4-hydroxybenzyl) benzene, 1,1,3-tris(2-methyl-4-hydroxy-5-t-butylphenyl) butane, and triethylene glycol bis(3-(3-t-butyl-5-methyl-4-hydroxyphenyl)propionate).

Examples of sulfur compounds which can be used as the heat stabilizer (C) include benzensulfinic acid, p-toluenesulfonic acid, benzenesulfonic acid, p-toluenesulfonic acid, naphthalenesulfonic acid, and a methyl, ethyl, butyl, octyl or phenyl ester thereof. Further examples of sulfur compounds which can be used as the heat stabilizer (C) include dilauryl-3,3'-thiodipropionate, ditridecyl-3,3'-thiodipropionate, dimyristyl-3,3'-thiodipropionate, distearyl-3,3'-thiodipropionate and pentaerythritol(β-lauryl thiopropionate).

Examples of epoxy compounds which can be used as the heat stabilizer (C) include fats and oils, such as epoxidized soybean oil and epoxidized linseed oil; glycidyl compounds, such as phenyl glycidyl ether, allyl glycidyl ether, t-butylphenyl glycidyl ether, diglycidyl ether of bisphenol A, diglycidyl ether of tetra-bromobisphenol A, diglycidyl phthalate and diglycidyl hexahydrophthalate; epoxycyclohexane compounds, such as 3,4-epoxycyclohexylmethyl-3,4-epoxycyclohexane carboxylate, 3,4-epoxy-6-methylcyclohexylmethyl-3,4-epoxycyclohexane carboxylate, 2,3-epoxycyclohexylmethyl-3,4-epoxycyclohexane carboxylate, 4-(3,4-epoxy-5-methylcyclohexyl)butyl-3,4-epoxycyclohexane carboxylate, 3,4-epoxycyclohexylethylene oxide, cyclohexylmethyl-3,4-epoxycyclohexane carboxylate, 3,4-epoxy-6-methylcyclohexylmethyl-6-methylcyclohexane carboxylate, bisepoxycyclohexyl adipate, octadecyl-2,2'-dimethyl-3,4-epoxycyclohexane carboxylate, N-butyl-2,2'-dimethyl-3,4-epoxycyclohexane carboxylate, cyclohexyl-2-methyl-3,4-epoxycyclohexane carboxylate, N-butyl-2-isopropyl-3,4-epoxy-5-isopropyl-3,4-epoxy-5-methylcyclohexane carboxylate, octadecyl-3,4-epoxycyclohexane carboxylate, 2-ethylhexyl-3,4-epoxycyclohexane carboxylate, 4,6-dimethyl-2,3-epoxycyclohexyl-3,4-epoxycyclohexane carboxylate, diethyl-4,5-epoxy-cis-1,2-cyclohexane carboxylate, di-n-butyl-3-t-butyl-4,5-epoxy-cis-1,2-cyclohexane carboxylate, 3,4-dimethyl-1,2-epoxycyclohexane, 3,5-dimethyl-1,2-epoxycyclohexane and 3-methyl-5-t-butyl-1,2-epoxycyclohexane; bisepoxydicyclopentadienyl ether; butadiene diepoxide, tetraphenylethylene epoxide; epoxidized polybutadiene; 4,5-epoxytetrahydrophthalic anhydride; and 3-t-butyl-4,5-epoxytetrahydrophthalic anhydride.

Examples of acidic compounds which can be used as the heat stabilizer (C) include inorganic acids, such as boric acid; organic acids, such as adipic acid, citric acid and acetic acid; sulfonic acids, such as benzenesulfonic acid and p-toluenesulfonic acid; and sulfonic esters, such as ethyl benzenesulfonate and butyl p-toluenesulfonate.

Of these heat stabilizers, phosphorus compounds, phenolic compounds and acidic compounds are preferred. The heat stabilizers (C) may be used individually or in combination. With respect to the amount of the heat stabilizer (C), there is no particular limitation. The amount of the heat stabilizer (C) is generally from 0.00005 to 0.3 part by weight, preferably from 0.001 to 0.1 part by weight, more preferably from 0.002 to 0.05 part by weight, relative to 100 parts by weight of the polycarbonate resin (A).

The polycarbonate resin composition of the present invention can be produced by melt-kneading the polycarbonate resin (A), the mold release agent (B), and optionally the heat stabilizer (C) together. With respect to the method for melt-kneading the polycarbonate resin (A), the mold release agent (B), and optionally the heat stabilizer (C), there is no particular limitation. It is preferred that the melt-kneading is conducted by using a single screw extruder or a twin-screw extruder. The temperature employed for the melt-kneading is generally from 250 to 300° C. Especially, when the polycarbonate resin (A) is produced by the melt process, it is preferred that the mold release agent (B) and optionally the heat stabilizer (C) are added to the polycarbonate resin (A) while maintaining the molten state of the polycarbonate resin (A) obtained. Further, additives other than the mold release agent (B) and the heat stabilizer (C) may be used. Examples of such additives include an antistatic agent, a catalyst-deactivating agent, a dye and a pigment.

In the present invention, when the plurality of aromatic polycarbonate main chains of the polycarbonate resin (A) contain low molecular weight polycarbonate chains, each independently having a molecular weight of 1,000 or less, the total amount of the low molecular weight polycarbonate chains, the mold release agent (B) and the heat stabilizer (C) if any (hereinafter, the low molecular weight polycarbonate chains, the mold release agent (B) and the heat stabilizer (C) are collectively referred to as the "low molecular weight components") is preferably from 0.5 to 1.5% by weight, more preferably from 0.6 to 1.2% by weight, based on the weight of the polycarbonate resin composition. When the polycarbonate resin (A) contains unreacted monomers, such as the aromatic dihydroxy compound, such unreacted monomers are also defined as the low molecular weight polycarbonate chains having a molecular weight of 1,000 or less.

The determination of the amount of the low molecular weight polycarbonate chains having a molecular weight of 1,000 or less can be conducted by gel permeation chromatography (GPC). Specifically, the polycarbonate resin (A) is subjected to GPC using tetrahydrofuran (as a solvent) and a polystyrene gel column. A modified calibration curve for the polycarbonate resin (A) is obtained by modifying a calibration curve obtained with respect to standard monodisperse polystyrene samples, wherein the modification of the calibration curve is made by a calculation using the following formula:

$$M_{pc}=0.3591\ M_{ps}10388$$

wherein $M_{pc}$ represents the molecular weight of the polycarbonate resin (A), and $M_{ps}$ represents the molecular weight of the standard polystyrene. Using the calibration curve, the weight fraction of the polycarbonate chains having a molecular weight of 1,000 or less is obtained. From the obtained weight fraction, the amount of low molecular weight polycarbonate chains having a molecular weight of 1,000 or less contained in the polycarbonate resin (A) is calculated.

The determination of the amounts of the mold release agent (B) and the heat stabilizer (C) can be conducted as follows. The polycarbonate resin composition is dissolved in methylene chloride to obtain a solution. The polycarbonate resin (A) is removed from the solution by the use of a poor solvent for the polycarbonate resin. Then, the amounts of the mold release agent (B) and the heat stabilizer (C) contained in the resultant solution are determined by NMR spectroscopy, gas chromatography/mass spectrometry (GC/MS) or the like. Further, when the polycarbonate resin composition contains a phosphorus compound as the heat stabilizer (C), the amount of the phosphorus compound as the heat stabilizer (C) can also be determined by fluorescent X-ray analysis.

When the amount of the low molecular weight components is smaller than the above-mentioned range, it is possible that the melt fluidity or transferability of the polycarbonate resin composition becomes low. On the other hand, when the amount of the low molecular weight components exceeds the above-mentioned range, it is possible that mold deposit markedly occurs in the molding of the polycarbonate resin composition.

It is preferred that the polycarbonate resin composition of the present invention exhibits a relative viscosity lowering ratio (%) of not more than 1%, more advantageously not more than 0.5%, wherein the relative viscosity lowering ratio (%) is defined by the formula: $[(\eta_r^1-\eta_r^2)/(\eta_r^1)]\times100$, wherein $\eta_r^1$ represents the relative viscosity $(\eta/\eta_o)$ as exhibited by the polycarbonate resin composition which has been subjected to a continuous molding in a molding machine having a cylinder temperature of 350° C., and $\eta_r^2$ represents the relative viscosity $(\eta/\eta_o)$ as exhibited by the polycarbonate resin composition which has been subjected to a non-continuous molding in a molding machine having a cylinder temperature of 350° C. wherein the residence time of the resin composition in the molding machine is 10 minutes. Each of the relative viscosities $\eta_r$ and $2\ \eta_r^2$ can be measured by the same method as used for measuring the relative viscosity $(\eta_r)$ In the abovementioned continuous molding in a molding machine, the polycarbonate resin composition generally stays in the cylinder of the molding machine for a period of time needed for conducting 3 to 5 cycles of the molding, and the residence time of the polycarbonate resin composition is generally 1 minute or less. The above-mentioned feature that the relative viscosity lowering ratio (%) of the polycarbonate resin composition is not more than 1% means that the polycarbonate resin composition exhibits excellent thermal stability during the molding thereof. When the relative viscosity lowering ratio (%) of the polycarbonate resin composition exceeds 1%, mold deposit tends to occur markedly.

The polycarbonate resin composition of the present invention can be advantageously used for the production of a disc-shaped substrate (having a thickness of 1.2 mm or less) for an optical information medium, such as a CD, a CD-R, a CD-RW, an MD, an MO, a DVD or a DVD-RAM. By virtue of the excellent melt fluidity of the polycarbonate resin composition of the present invention, the polycarbonate resin composition is especially useful as a material for a DVD substrate disc having a thickness of about 0.6 mm, and as a material for substrates for next-generation optical information media, which have a thickness of 0.6 mm or less, preferably from 0.1 to 0.6 mm. Accordingly, in another aspect of the present invention, there is provided a substrate for an optical information medium, which is in the form of a disc having a thickness of 0.6 mm or less, and which is produced by subjecting the polycarbonate resin composition of the present invention. With respect to the method for molding the polycarbonate resin composition to obtain the substrate of the present invention for an optical information medium, which is in the form of a disc having a thickness of 0.6 mm or less, there is no particular limitation. For example, the substrate of the present invention can be produced by subjecting the polycarbonate resin composition of the present invention to an injection molding using an injection molding machine for producing optical discs. It is preferred that the injection molding is performed under conditions wherein the molding temperature is from 300 to 390° C., the mold temperature is from 40 to 130° C., and the molding cycle is from 2 to 15 seconds. As the injection molding machine for producing optical discs, a conventional one can be used.

BEST MODE FOR CARRYING OUT THE INVENTION

Hereinbelow, the present invention will be described in more detail with reference to the following Examples and Comparative Examples, which should not be construed as limiting the scope of the present invention.

In the following Examples and Comparative Examples, various properties were measured and evaluated as follows.
① Measurement of the Relative Viscosity $(\eta_r)$:

The viscosity value $(\eta_o)$ of methylene chloride, and the viscosity value $(\eta)$ of a methylene chloride solution of a polycarbonate resin composition in which the concentration of the polycarbonate resin composition is 0.005 g/cm², are measured at 25° C. using a Ub-bellohde viscosity tube. The ratio $(\eta/\eta_o)$ of $\eta$ to $\eta_o$ is defined as the relative viscosity $(\eta_r)$.
② Determination of the Amount of Low Molecular Weight Polycarbonate Chains Having a Molecular Weight of 1,000 or Less Contained in the Polycarbonate resin (A):

The polycarbonate resin (A) is subjected to gel permeation chromatography (GPC) using tetrahydrofuran (as solvent) and a polystyrene gel column. A modified calibration curve for the polycarbonate resin (A) is obtained by modifying a calibration curve obtained with respect to standard monodisperse polystyrene samples, wherein the modification of the calibration curve is made by a calculation using the following formula:

$$M_{pc}=0.3591\ M_{ps}1.0388$$

wherein $M_{pc}$ represents the molecular weight of the polycarbonate resin (A), and $M_{ps}$ represents the molecular weight of the standard polystyrene.

Using the modified calibration curve, the weight fraction of the polycarbonate chains having a molecular weight of 1,000 or less is obtained. From the obtained weight fraction, the amount of low molecular weight polycarbonate chains having a molecular weight of 1,000 or less contained in the polycarbonate resin (A) is calculated.

③ Evaluation of the Moldability of a Polycarbonate Resin Composition in the Molding Thereof for Producing a Substrate for an Optical Information Medium:

A disc-shaped substrate (thickness: 0.6 mm) for a DVD (hereinafter, frequently referred to simply as a "DVD substrate disc"), which has grooves formed on the surface thereof, is produced by subjecting a polycarbonate resin composition to an injection molding, using an injection molding machine for producing optical discs (J35EL II-DK, manufactured and sold by THE JAPAN STEEL WORKS. LTD., Japan), under conditions wherein the molding temperature is 350° C., the mold temperature is 120° C., and the molding cycle is 8.6 seconds.

As a yardstick for the moldability, with respect to the produced DVD substrate disc, the transferability is evaluated using a disc analyzing system (PROmeteus, manufactured and sold by Dr. Schenk GmbH, Germany).

The transferability (%) of the DVD substrate disc is calculated by the following formula:

Transferability (%)=(D$_1$/D$_2$)×100 wherein D$_1$ represents the average value of groove depths as measured at a distance of 50 mm from the center of the disc, and D$_2$ represents the groove depth of the stamper used.

It is desirable that the transferability value of a DVD substrate disc is at least 95%.

④ Mechanical Strength of a DVD Substrate Disc:

Using the DVD substrate disc produced above, a flexural test is conducted in which the distance between the supports is 40 mm and the bending of the disc is performed at a rate of 2 mm/second. The maximum flexural strength is measured for the evaluation of the mechanical strength of the DVD substrate disc.

⑤ Mold Deposit (MD):

DVD substrate discs (each having a thickness of 0.6 mm) are continuously produced by subjecting a polycarbonate resin composition to an injection molding, using an injection molding machine for producing optical discs (J35EL II-DK, manufactured and sold by THE JAPAN STEEL WORKS. LTD., Japan), under conditions wherein the molding temperature is 350° C., the mold temperature is 120° C., and the molding cycle is 8.6 seconds. Prior to the production of the DVD substrate discs, the cleaning of the cavity and the stamper is conducted and the weight of the stamper is measured. After 20,000 DVD substrate discs are produced, the weight of the stamper is measured again. The amount of MD is defined as the difference between the weight of the stamper before the production of DVD substrate discs and the weight of the stamper after the production of 20,000 DVD substrate discs.

⑥ Thermal Stability of a Polycarbonate Resin Composition During the Residence Thereof in a Molding Machine (Relative Viscosity Lowering Ratio (%)):

Continuous production of DVD substrate discs (each having a thickness of 0.6 mm) is conducted by subjecting a polycarbonate resin composition to an injection molding, using an injection molding machine for producing optical discs (J35EL II-DK, manufactured and sold by THE JAPAN STEEL WORKS. LTD., Japan), under conditions wherein the molding temperature is 350° C., the mold temperature is 120° C., and the molding cycle is 8.6 seconds. Then, the molding operation is stopped to allow the polycarbonate resin composition to stay in the injection molding machine for 10 minutes. After this period of time, the molding operation is resumed. With respect to the relative viscosity ($\eta_r^1$) exhibited by a polycarbonate resin composition sample taken from the last DVD substrate produced before the molding is stopped and the relative viscosity ($\eta_r^2$) exhibited by a polycarbonate resin composition sample taken from the first DVD substrate disc produced after the molding is resumed, measurements thereof are conducted in the same manner as in the measurement of the relative viscosity ($\eta_r$) in item ① above. The relative viscosity lowering ratio (%) is calculated by the formula:

[($\eta_r^1 - \eta_r^2$)/($\eta_r^1$)]×100.

⑦ Melt Index

The melt index (MI) of a polycarbonate resin composition is measured at 280° C. under a load of 2.16 kg in accordance with JIS K 7210.

EXAMPLE 1

A polycarbonate resin (A) was produced by melt transesterification using a polymerizer system comprising first stage agitation type polymerizer vessels (a) and (b), a second stage agitation type polymerizer vessel, a third stage agitation type polymerizer vessel, a first stage wire-wetting fall polymerizer equipped with 40 strands of 8 m long and 1.5 mmφ wires, and a second stage wire-wetting fall polymerizer equipped with 40 strands of 8 m long and 1.5 mmφ wires, wherein the polymerizer vessels and the wire-wetting fall polymerizers are connected in series through pipes. The production of the polycarbonate resin (A) was performed as follows.

A first stage agitation type polymerization was performed in first stage agitation type polymerizer vessels (a) and (b), each having a capacity of 100 liters, as follows. In first stage agitation type polymerizer vessels (a) and (b), which were used alternately, a polymerizable material comprising bisphenol A as an aromatic dihydroxy compound and diphenyl carbonate as a carbonic diester (the molar ratio of diphenyl carbonate to bisphenol A: 1.07) was subjected to melt polymerization in the presence of sodium hydroxide as a catalyst (the amount of the sodium hydroxide in terms of the amount of sodium atom: 80 ppb by weight, based on the weight of bisphenol A) at 180° C. under atmospheric pressure, thereby obtaining prepolymer 1.

The obtained prepolymer 1 was fed to the second stage agitation type polymerizer vessel having a capacity of 50 liters at a flow rate of 8 kg/hr. In the second stage agitation type polymerizer vessel, prepolymer 1 was subjected to a second stage agitation type polymerization at 222° C. under a pressure of 9,300 Pa, thereby obtaining prepolymer 2.

The obtained prepolymer 2 was continuously fed to the third stage agitation type polymerizer vessel having a capacity of 50 liters. In the third stage agitation type polymerizer vessel, prepolymer 2 was subjected to a third stage agitation type polymerization at 260° C. under a pressure of 2,600 Pa, thereby obtaining prepolymer 3.

The obtained prepolymer 3 was continuously fed to the first stage wire-wetting fall polymerizer. In the first stage wire-wetting fall polymerizer, prepolymer 3 was subjected to a first stage wire-wetting fall polymerization at 263° C. under a pressure of 800 Pa, thereby obtaining prepolymer 4.

The obtained prepolymer 4 was continuously fed to the second stage wire-wetting fall polymerizer. In the second stage wire-wetting fall polymerizer, prepolymer 4 was subjected to a second stage wire-wetting fall polymerization at 263° C. under a pressure of 150 Pa, thereby obtaining the polycarbonate resin (A).

The obtained polycarbonate resin (A) was fed into a twin-screw extruder (PCM30, manufactured and sold by IKEGAI CORP, Japan) (temperature: 260° C.) through an inlet of the extruder, to which inlet the second stage wire-wetting fall polymerizer is connected. Further, using a pump, 400 ppm by weight of pentaerythritol stearate (mold release agent (B)) was fed into the twin-screw extruder through another inlet of the extruder. The polycarbonate resin (A) and the pentaerythritol stearate (mold release agent (B)) were melt-kneaded in the twin-screw extruder, thereby obtaining pellets of a polycarbonate resin composition.

With respect to the obtained polycarbonate resin composition, the MI was 81 g/min, the relative viscosity as 1.1824, the value of the right side of formula (I) was 1.1780 and the value of the right side of formula (II) was 1.1860. Therefore, the polycarbonate resin composition satisfied formulae (I) and (II). The total amount of low molecular weight components (i.e., the sum of the amount of low molecular weight polycarbonate chains having a molecular weight of 1,000 or less, which was measured by the above-mentioned method, and the amount of the above-mentioned mold release agent (B)) contained in the polycarbonate resin composition was 1.1% by weight, based on the weight of the polycarbonate resin composition.

The results of the measurements and evaluations of various properties of the polycarbonate resin composition are shown in Table 1. As can be seen from Table 1, the obtained polycarbonate resin composition was excellent with respect to all of the transferability and mechanical strength of the DVD substrate disc produced therefrom, the amount of MD, and the thermal stability during the residence thereof in the injection molding machine.

EXAMPLE 2

Into a reactor equipped with a stirrer was charged 200 liters of a 5% aqueous sodium hydroxide solution. Into the reactor were charged 100 moles of bisphenol A, 0.5 mole of 1,1,1-tris(4-hydroxyphenyl)ethane to thereby dissolve the bisphenol A and the 1,1,1-tris(4-hydroxy-phenyl)ethane in the aqueous sodium hydroxide solution in the reactor. To the resultant solution were added 6.2 moles of p-t-butylphenol, 100 liters of methylene chloride and 0.003 mole of triethylamine, thereby obtaining a mixture. 100.5 moles of phosgene gas was blown into the reactor over 40 minutes while stirring and maintaining the temperature of the mixture in the reactor within the range of from 15 to 25° C., thereby effecting a reaction of the bisphenol A with the phosgene. After completion of the blow introduction of the phosgene gas into the reactor, 0.5 liter of a 48% aqueous sodium hydroxide solution was charged into the reactor, and the resultant mixture was stirred at 25 to 33° C. for 1 hr, thereby completing the reaction. To the resultant mixture was added 100 liters of methylene chloride, thereby obtaining a mixture in which a methylene chloride phase is formed. The methylene chloride phase was separated from the mixture, and the separated methylene chloride phase was washed with a 0.01 N aqueous sodium hydroxide solution, followed by washing with a 0.01 N hydrochloric acid, and subsequent washing with water. From the resultant was removed methylene chloride by evaporation, thereby obtaining a polycarbonate resin (A). The obtained polycarbonate resin (A), 100 ppm by weight of tris(2,4-di-t-butylphenyl) phosphite (heat stabilizer (C)) and 400 ppm by weight of pentaerythritol stearate (mold release agent (B)) were fed into and melt-kneaded in a twin-screw extruder (PCM30, manufactured and sold by IKEGAI CORP, Japan) (temperature: 260° C.), thereby obtaining pellets of a polycarbonate resin composition.

With respect to the obtained polycarbonate resin composition, the MI was 95 g/min, the relative viscosity was 1.1767, the value of the right side of formula (I) above was 1.1730 and the value of the right side of formula (II) above was 1.1810. Therefore, the polycarbonate resin composition satisfied formulae (I) and (II). The total amount of low molecular weight components (i.e., the sum of the amount of low molecular weight polycarbonate chains having a molecular weight of 1,000 or less, which was measured by the above-mentioned method, the amount of the mold release agent (B) used, and the amount of the heat stabilizer (C) used) contained in the polycarbonate resin composition was 2.1% by weight, based on the weight of the polycarbonate resin composition.

The results of the measurements and evaluations of various properties of the polycarbonate resin composition are shown in Table 1. The amount of MD was slightly large, but was at a level which does not cause any practical problems. The polycarbonate resin composition was excellent with respect to the transferability and mechanical strength of the DVD substrate disc produced therefrom, and the thermal stability during the residence thereof in the injection molding machine. This means that the polycarbonate resin composition can be advantageously used for the production of a substrate for an optical information medium.

EXAMPLE 3

A polycarbonate resin (A) was produced in substantially the same manner as in Example 1, except that the reaction conditions were changed as follows: the molar ratio of diphenyl carbonate to bisphenol A was 1.03; the amount of sodium hydroxide as a catalyst was 150 ppb by weight, based on the weight of bisphenol A, in terms of the amount of sodium atom; the second stage agitation type polymerization in the second stage agitation type polymerizer vessel was performed at 230° C. under a pressure of 9,000 Pa; the third stage agitation type polymerization in the third stage agitation type polymerizer vessel was performed at 262° C. under a pressure of 2,500 Pa; the first stage wire-wetting fall polymerization in the first stage wire-wetting fall polymerizer was performed at 262° C. under a pressure of 800 Pa; and the second stage wire-wetting fall polymerization in the second stage wire-wetting fall polymerizer was performed at 261° C. under a pressure of 170 Pa.

The produced polycarbonate resin (A) was fed into a twin-screw extruder (PCM30, manufactured and sold by IKEGAI CORP, Japan) (temperature: 260° C.) through an inlet of the extruder, to which inlet the second stage wire-wetting fall polymerizer is connected. Further, using a pump, 150 ppm by weight of tris(4-nonylphenyl)-phosphite (heat stabilizer (C)) in the molten state and 500 ppm by weight of glycerol monostearate (mold release agent (B)) were fed into the twin-screw extruder through another inlet of the extruder. The polycarbonate resin (A), the tris(4-nonylphenyl)phosphite (heat stabilizer (C)) and the pentaerythritol stearate (mold release agent (B)) were melt-kneaded in the twin-screw extruder, thereby obtaining pellets of a polycarbonate resin composition.

With respect to the obtained polycarbonate resin composition, the MI was 93 g/min, the relative viscosity was 1.1742, the value of the right side of formula (I) above was 1.1737 and the value of the right side of formula (II) above was 1.1817. Therefore, the polycarbonate resin composition satisfied formulae (I) and (II). The total amount of low molecular weight components contained in the polycarbonate resin composition was 0.2% by weight, based on the weight of the polycarbonate resin composition.

The results of the measurements and evaluations of various properties of the polycarbonate resin composition are shown in Table 1. With respect to the obtained polycarbonate resin composition, the DVD substrate disc produced therefrom had excellent mechanical strength, but the transferability of the DVD substrate disc and the thermal stability during the residence thereof in the injection molding machine were slightly low as compared to those in Examples 1 and 2, and the amount of MD was slightly large as compared to that in Example 1. However, the polycarbonate resin composition can be advantageously used for the production of a substrate for an optical information medium.

COMPARATIVE EXAMPLE 1

A polycarbonate resin was produced in substantially the same manner as in Example 2, except that 1,1,1-tris(4-hydroxyphenyl)ethane was not used and the amount of phosgene gas blown into the reactor was 100 moles.

With respect to the obtained polycarbonate resin composition, the MI was 85 g/min, the relative viscosity was 1.1878, the value of the right side of formula (II) above was 1.1845. Therefore, the polycarbonate resin composition did not satisfy formula (II). The total amount of low molecular weight components contained in the polycarbonate resin composition was 1.9% by weight, based on the weight of the polycarbonate resin composition.

The results of the measurements and evaluations of various properties of the polycarbonate resin composition are shown in Table 1. The transferability of the DVD substrate disc produced was as low as 73%. Such a disc cannot be used as a substrate for an optical information medium. Therefore, a further experiment was conducted to measure a molding temperature at which a DVD substrate disc having a transferability of 95% or more can be obtained. As a result, it was found that a transferability of 95% or more can be achieved by molding at a temperature as high as 380° C. However, in the molding of the polycarbonate resin composition at 380° C., disadvantages were caused wherein the molding cycle was increased to 11 seconds, the amount of MD became very large, and the thermal stability of the polycarbonate resin composition during the residence thereof in the injection molding machine became very low.

COMPARATIVE EXAMPLE 2

A polycarbonate resin was produced in substantially the same manner as in Example 2, except that the molar ratio of diphenyl carbonate to bisphenol A was 1.05 and 1,1,1-tris (4-hydroxyphenyl)ethane was not used.

With respect to the obtained polycarbonate resin composition, the MI was 60 g/min, the relative viscosity was 1.1923, the value of the right side of formula (I) above was 1.1874 and the value of the right side of formula (II) above was 1.1954. Therefore, although the polycarbonate resin composition satisfied formulae (I) and (II), the above-mentioned value (1.1923) of the relative viscosity exceeded the upper limit (1.19) of the relative viscosity defined in the present invention. The total amount of low molecular weight components contained in the polycarbonate resin composition was 0.8% by weight, based on the weight of the polycarbonate resin composition.

The results of the measurements and evaluations of various properties of the polycarbonate resin composition are shown in Table 1. The polycarbonate resin composition had poor melt fluidity such that it was impossible to conduct the injection molding of the polycarbonate resin composition even when the maximum injection pressure of the injection molding machine was applied.

COMPARATIVE EXAMPLE 3

A polycarbonate resin was produced in substantially the same manner as in Example 3, except that the second stage wire-wetting fall polymerization in the second stage wire-wetting fall polymerizer was performed at 273° C. under a pressure of 200 Pa.

With respect to the obtained polycarbonate resin composition, the MI was 120 g/min, the relative viscosity was 1.1670, the value of the right side of formula (I) above was 1.1657 and the value of the right side of formula (II) above was 1.1737. Therefore, although the polycarbonate resin composition satisfied formulae (I) and (II), the above-mentioned value (1.1670) of the relative viscosity was smaller than the lower limit (1.17) of the relative viscosity defined in the present invention. The total amount of low molecular weight components contained in the polycarbonate resin composition was 1.3% by weight, based on the weight of the polycarbonate resin composition.

The results of the measurements and evaluations of various properties of the polycarbonate resin composition are shown in Table 1. The polycarbonate resin composition was excellent with respect to the transferability of the DVD substrate disc produced therefrom, the amount of MD, and the thermal stability during the residence thereof in the injection molding machine. However, the DVD substrate disc had very poor mechanical strength such that it cannot be put into practical use.

COMPARATIVE EXAMPLE 4

A polycarbonate resin was produced in substantially the same manner as in Example 1, except that the first stage wire-wetting fall polymerization in the first stage wire-wetting fall polymerizer and the second stage wire-wetting fall polymerization in the second stage wire-wetting fall polymerizer were performed at 286° C.

With respect to the obtained polycarbonate resin composition, the MI was 70 g/min, the relative viscosity was 1.1772, the value of the right side of formula (I) was 1.1826. Therefore, the polycarbonate resin composition did not satisfy formula (I) above. The total amount of low molecular weight components contained in the polycarbonate resin composition was 1.1% by weight, based on the weight of the polycarbonate resin composition.

The results of the measurements and evaluations of various properties of the polycarbonate resin composition are shown in Table 1. The polycarbonate resin composition was excellent with respect to the transferability of the DVD substrate disc produced therefrom, the amount of MD, and the thermal stability during the residence thereof in the injection molding machine. However, the DVD substrate disc had very poor mechanical strength such that the DVD substrate disc cannot be put into practical use.

TABLE 1

|  | MI (g/10 min) | $\eta_r$ | Whether or not formulae (I) and (II) are satisfied | Total amount of the low molecular weight components | Evaluation on the molding for producing the substrate disc | | | |
|---|---|---|---|---|---|---|---|---|
|  |  |  |  |  | Transferability (%) | Mechanical strength of the substrate disc (kg) | Amount of MD (mg) | Relative viscosity lowering ratio (%) |
| Example 1 | 81 | 1.1824 | satisfied | 1.1 | 98 | 7.6 | 3 | 0.1 |
| Example 2 | 95 | 1.1767 | satisfied | 2.1 | 99 | 7.1 | 14 | 0.2 |
| Example 3 | 93 | 1.1742 | satisfied | 0.2 | 93 | 7.2 | 8 | 0.6 |
| Comparative Example 1 | 85 | 1.1878 | not satisfied | 1.9 | 73 | 7.0 | 22 | 0.8 |
| Comparative Example 2 | 60 | 1.1923 | satisfied | 0.8 | not moldable | not moldable | not moldable | not moldable |
| Comparative Example 3 | 120 | 1.1670 | satisfied | 1.3 | 100 | 2.0 | 2 | 0.2 |
| Comparative Example 4 | 70 | 1.1772 | not satisfied | 1.1 | 98 | 2.5 | 4 | 0.4 |

INDUSTRIAL APPLICABILITY

The polycarbonate resin composition of the present invention for the production of a substrate for an optical information medium not only exhibits an excellent moldability even when molded at low temperatures, but also enables the so-called high cycle molding. Further, the polycarbonate resin composition exhibits excellent thermal stability during the molding thereof, and is capable of suppressing occurrence of mold deposit (MD) during the molding thereof. Moreover, when the polycarbonate resin composition is molded to obtain a substrate for an optical information medium, such as an optical disc (such as a CD or a DVD), the substrate exhibits a satisfactorily high mechanical strength. Therefore, the polycarbonate resin composition of the present invention can be very advantageously used for the production of a substrate for an optical information medium (such as a DVD), which has high recording density and a very small thickness.

What is claimed is:

1. A polycarbonate resin composition for the production of a substrate for an optical information medium, comprising:

100 parts by weight of a polycarbonate resin (A) comprising a plurality of aromatic polycarbonate main chains, and 0.0005 to 1.0 part by weight of a mold release agent (B), wherein said polycarbonate resin composition exhibits a relative viscosity ($\eta_r$) within the range of from 1.17 to 1.19, said relative viscosity ($\eta_r$) being defined as the ratio ($\eta/\eta_o$) of viscosity value ($\eta$) of a methylene chloride solution of said polycarbonate resin composition to viscosity value ($\eta_o$) of methylene chloride, wherein the concentration of the polycarbonate resin composition in said methylene chloride solution is 0.005 g/cm$^3$ and each of said viscosity values ($\eta$) and ($\eta_o$) is measured at 25° C., and wherein said relative viscosity ($\eta_r$) of the polycarbonate resin composition and a melt index (MI) of the polycarbonate resin composition as measured at 280° C. under a load of 2.16 kg in accordance with JIS K 7210 satisfy the following formulae (I) and (II):

$$\eta_r \geq -0.0723 \log MI + 1.316 \quad \text{(I) and}$$

$$\eta_r \leq -0.0723 \log MI + 1.324 \quad \text{(II).}$$

2. The polycarbonate resin composition according to claim 1, wherein said mold release agent (B) comprises a higher aliphatic acid ester.

3. The polycarbonate resin composition according to claim 1, which further comprises 0.00005 to 0.3 part by weight of a heat stabilizer (C) comprising a compound selected from the group consisting of a phosphorus compound, a phenolic compound and an acidic compound.

4. The polycarbonate resin composition according to claim 1, wherein said plurality of aromatic polycarbonate main chains of said polycarbonate resin (A) contain low molecular weight polycarbonate chains, each independently having a molecular weight of 1,000 or less, and wherein the total amount of said low molecular weight polycarbonate chains and said mold release agent (B) is 0.5 to 1.5% by weight, based on the weight of said polycarbonate resin composition.

5. The polycarbonate resin composition according to claim 3, wherein said plurality of aromatic polycarbonate main chains of said polycarbonate resin (A) contain low molecular weight polycarbonate chains, each independently having a molecular weight of 1,000 or less, and wherein the total amount of said low molecular weight polycarbonate chains, said mold release agent (B) and said heat stabilizer (C) is 0.5 to 1.5% by weight, based on the weight of said polycarbonate resin composition.

6. The polycarbonate resin composition according to claim 1, which exhibits a relative viscosity lowering ratio (t) of not more than 1%, said relative viscosity lowering ratio (%) being defined by the formula: $[(\eta_r^1 - \eta_r^2)/(\eta_r^1)] \times 100$, wherein $\eta_r^1$ represents the relative viscosity ($\eta/\eta_o$) as exhibited by the polycarbonate resin composition which has been subjected to a continuous molding in a molding machine having a cylinder temperature of 350° C., and r2 represents the relative viscosity ($\eta/\eta_o$) as exhibited by the polycarbonate resin composition which has been subjected to a non-continuous molding in a molding machine having a cylinder temperature of 350° C. wherein the residence time of the resin composition in said molding machine is 10 minutes.

7. The polycarbonate resin composition according to claim 1, wherein said polycarbonate resin is produced by transesterifying a carbonic diester with an aromatic dihydroxy compound in at least one polymerizer selected from the group consisting of a free-fall polymerizer having a perforated plate and a guide-wetting fall polymerizer having a perforated plate and at least one guide provided in association with the perforated plate.

8. A substrate for an optical information medium, which is in the form of a disc having a thickness of 0.6 mm or less, and which is produced by subjecting the polycarbonate resin composition of any one of claims 1 to 7 to an injection molding.

* * * * *